United States Patent [19]

Ray et al.

[11] Patent Number: 4,953,540

[45] Date of Patent: Sep. 4, 1990

[54] FRAMEWORK FOR SUPPORTING SURGICAL INSTRUMENTS AT A SURGICAL WOUND

[75] Inventors: Charles D. Ray, Wayzata; Eugene A. Dickhudt, Minneapolis, both of Minn.

[73] Assignee: Surgical Dynamics, Inc., Alameda, Calif.

[21] Appl. No.: 199,754

[22] Filed: May 27, 1988

Related U.S. Application Data

[63] Continuation-in-part of Ser. No. 66,147, Jun. 25, 1987, Pat. No. 4,805,599.

[51] Int. Cl.[5] .............................................. A61B 17/02

[52] U.S. Cl. ........................................ 128/20; 269/328

[58] Field of Search .................................... 128/20, 17; 269/322-328; 211/204

[56] References Cited

U.S. PATENT DOCUMENTS

| | | | |
|---|---|---|---|
| 1,230,873 | 6/1917 | Crossley | 128/20 |
| 1,747,799 | 2/1930 | Straus | 128/20 |
| 3,329,423 | 7/1967 | Kleinman | 269/324 |
| 3,394,701 | 7/1968 | Hindle | 269/328 |
| 3,759,252 | 9/1973 | Berman | 269/328 |
| 3,907,270 | 9/1975 | Ezzo | 269/328 |
| 4,617,916 | 10/1986 | LeVahn et al. | 269/328 |
| 4,653,482 | 3/1987 | Kurland | 269/328 |

*Primary Examiner*—Theatrice Brown
*Assistant Examiner*—Mark S. Graham
*Attorney, Agent, or Firm*—Fliesler, Dubb, Meyer & Lovejoy

[57] ABSTRACT

Framework for supporting surgical instruments such as retractors at a surgical wound includes a pair of rigid frames that together form a rectangular retractor ring from which surgical instruments such as retractors can be suspended above an operating table, thus eliminating the need for surgical assistants to hold instruments by hand. Each of the rigid frames has a crossarm that is releasably and rotatably attached to a crosspiece that extends across the operating table. This rotatable attachment enables either of the frames to be pivotably retracted from time to time to afford better access to the wound. While one of the rigid frames is so retracted, the other can continue to support surgical instruments. The framework is especially useful in back surgery in combination with a kneeling attachment including a platform on which a patient kneels.

6 Claims, 6 Drawing Sheets

FRAMEWORK FOR SUPPORTING SURGICAL INSTRUMENTS AT A SURGICAL WOUND

CROSS-REFERENCE TO COPENDING APPLICATIONS

This application is a continuation-in-part of copending application Ser. No. 07/066,147, filed June 25, 1987 (now U.S. Pat. No. 4,805,599, issued Feb. 21, 1989), by Charles D. Ray, one of the inventors herein.

The framework of this invention can be mounted on the buttocks support of said application S.N. 07/066,147 that is assigned to a company which has been merged into the assignee company of the present application. The novel framework can be mounted on sockets of application S.N. 07/182,401, filed Apr. 8, 1988 and assigned to the assignee company of the present application. The disclosures of 07/066,147 and 07/182,401 are incorporated herein by reference.

BACKGROUND OF THE INVENTION

1. Field of the Invention

The invention relates to framework useful for supporting surgical instruments such as retractors at a surgical wound. The framework of the invention can be used during back surgery in conjunction with a kneeling attachment including a platform on which a patient kneels with the torso positioned over one end of an operating table while the buttocks rest against a buttocks support. The novel retraction device can also be used in abdominal surgery or in back surgery on a prone patient. The invention also concerns a surgical procedure for realigning vertebrae.

2. Description of Related Art

U.S. Pat. No. 4,254,763 (McCready et al.) reports that "in surgical operations on the chest or abdomen, it is customary to employ a retraction apparatus. Most, if not all, versions of the retraction apparatus are attached directly to the operating room table by means of affixation to a rail which is provided along each side of the table. Whether by connection to one or both rails, the retraction apparatus generally provides a framework extending over the region of the patient in which the operation is to be performed. One or more retractor blades are attached to the framework, and these blades are positioned in the incision and serve to hold back tissue, organs, and the like so that the surgeon may operate on the intended area" (col. 1, lines 11-27). While the McCready framework includes a ring-like frame from which retractors are suspended, a number of patents show rectangular frames. See, for example, U.S. Pat. No. 3,522,799 (Gauthier), No. 3,221,743 (Thompson et al.), No. 3,572,326 (Jensen), and No. 4,355,631 (LeVahn). Other U.S. patents showing ring-like frames include No. 2,586,488 (Smith), 2,594,086 (Smith), and 3,040,739 (Grieshaber). A frame of different shape is shown in U.S. Pat. No. 4,617,916 (LeVahn et al.). The framework of each of these patents is supported by siderails of the operating table, except that we fail to find in Gauthier any mention of support for his framework.

Apparatus like that shown in the LeVahn et al. patent is sold for use in abdominal surgery as the Omni-Tract 3005 Upper Abdominal/Bariatric Retractor System by Minnesota Scientific, Inc., Minneapolis, MN. The Omni-Tract framework includes a "crossbar" that is clamped by one or two posts to one or both rails of an operating table. Universal joints at the top of each of the posts permit the crossbar to be adjusted to the desired height and lateral distance from the surgical wound. Retractors can be mounted on the crossbar using universal clamps which can be swiveled to provide the desired lateral retraction from positions that do not obstruct access to the wound. Such universal clamps involve elaborate sequences to be connected, readjusted or disconnected and thus do not permit quick response to urgent situations.

Because of the far greater force needed to retract the powerful muscles of the back, the above-discussed frameworks are not said to be useful for back surgery. Furthermore, it is believed that no framework is available that would be suitable for supporting retractors above a surgical wound in the back. Instead of using such a framework, it is quite common in back surgery for a surgical assistant to hold a Hibbs-type retractor in place manually, sometimes for several hours. Not only does this fully occupy the assistant, but there is a danger that the assistant could move the retractor in a hazardous manner, and the danger could be amplified due both to fatigue and to boredom.

For back surgery, especially involving the lumbar spine, an operating table may be fitted with a kneeling attachment that permits a patient to assume the prone sitting position with the torso positioned over one end of the table. The buttocks can rest against a padded seat carried by the crosspiece of a rigid U-shaped yoke, the ends of which are releasably locked to opposite sides of the operating table. See, for example, U.S. Pat. No. 4,662,619 (Ray et al.); U.S. Pat. No. 4,391,438 (Heffington); and a brochure entitled "Andrews Spinal Surgery Frame" of Orthopedic Systems, Inc., Hayward, Calif. In using the kneeling attachment of the Ray et al. patent, the upper torso preferably rests on a cushion of sufficient height that the patient's arms can be comfortably tucked under the stomach.

SUMMARY OF THE INVENTION

The invention provides a framework that is useful for supporting surgical instruments such as retractors at a surgical wound and is especially useful in back surgery in combination with a kneeling attachment including a platform on which a patient kneels with the torso positioned over one end of an operating table and the buttocks resting against the crosspiece of a rigid U-shaped yoke. The framework of the invention is adapted to be so supported as to be capable of accommodating forces required to retract the powerful muscles of the back. As compared to frameworks shown in the above-cited patents, a preferred framework of the invention is remarkably uncluttered, easy to keep clean, and economical to manufacture. Even though some figures of the appended drawing show it beneath surgical drapery, the framework preferably is mounted over the drapery, permitting the framework to be removed and reattached without disturbing the drapery.

In using prototypes during prolonged surgical procedures, surgeons have found it convenient to lean against the rigid frame of the novel framework rather than against the patient's body. The novel framework can thus eliminate this undesirable practice commonly done as the surgeon becomes more fatigued.

Briefly, the novel framework includes: a rigid frame comprising a long straight leg and first and second relatively short, parallel crossarms extending substantially orthogonally from the ends of the leg, a rigid crosspiece, means for supporting the crosspiece from an operating table to extend above and across a patient who is lying on the operating table, means for releasably and rotatably attaching the free end of the first crossarm to the crosspiece, and means for supporting the free end of the second crossarm above and from the operating table. Said means for supporting the second crossarm of the frame can include a second rigid crosspiece, means for supporting the second crosspiece from the operating table to extend above and across the patient, and means for releasably and rotatably attaching the free end of the second crossarm to the second crosspiece.

The novel framework is believed to be the first to be useful in back surgery on a kneeling patient to replace a surgical assistant by holding a retractor at the proper angle in a surgical wound. When so used, the means for supporting the first-mentioned crosspiece preferably includes the kneeling attachment.

The length of each crossarm of the rigid frame preferably is less than half the width of a typical operating table. This permits the frame to fit easily into a conventional autoclave. By fixing an attachment bracket to each end of the long straight leg, the leg could be attached directly between a pair of rigid crosspieces, each of which would perform the function of a crossarm, thus eliminating the need for crossarms on the frame. In such event, the rigid crosspieces would need to be long enough to permit the long leg of the rigid frame to accommodate the largest patient, whereas a pair of crossarms permit the crosspieces to be shorter. Unduly long crossarms not only might be in the surgeon's way, but they might not fit into an autoclave. Even when the rigid frame of the novel framework has crossarms, it may be desirable to employ crosspieces that are shorter than the width of the operating table to make them fit into an ordinary autoclave.

Preferably the novel framework includes a second rigid frame that is a mirror image of the first-mentioned rigid frame and, with the first, can form a rectangular retractor ring, the width of which is adjustable to approximate the width of any patient's body. By forming a retractor ring, retraction can be applied from any side of a surgical wound. To permit the surgeon to move closer to the wound, either of the rigid frames of the retractor ring can be removed while the other rigid frame continues to provide retraction.

While being designed primarily for use with a kneeling patient, the novel framework can also be used with a prone patient when it includes a second rigid crosspiece and both crosspieces extend above and across the patient. For example, each crosspiece can be part of a yoke, each arm of which is connectible to a siderail. The yokes preferably are disconnectible into sections, each small enough to fit easily into a conventional autoclave.

Preferably one of the crossarms of the rigid frame of the novel framework is arched to follow the contour of the patient's body. When a pair of the rigid frames form a rectangular retractor ring, their arching allows the legs of each frame to be approximately at the top of the patient's body while avoiding any contact between the crossarms of the frames and either the chest or back of the patient. In the absence of such an arch, the legs of the frame would need to be at a higher position and hence might unduly interfere with access by the surgeon to the wound. When the legs of the frame are approximately level with the patient's back and hence above the bony anatomy (i.e., the spinous processes, vertebrae, etc.), they can be metal and yet not obstruct lateral x-rays.

In order to suspend surgical instruments from directly above the wound, the novel framework may include a rigid crossbar that can be connected between the legs of a pair of frames that form a rectangular retractor ring. Such a crossbar is particularly useful for positioning a variety of surgical accessories other than retractors, e.g., bone clamps, x-ray markers, bone drill systems, and bone screw inserting devices. This also makes possible an important new surgical procedure by which a dislocated vertebra can be moved into position by a lifting mechanism such as a screw suspended either from the crossbar or from another rigid bar connected across two such crossbars.

When the novel framework is supported by a kneeling attachment, the platform of the attachment preferably is made of radiotransparent materials. This permits x-ray beams to pass from a generator positioned beneath the platform, upwards between a patient's kneeling legs, through the front of the patient's body, and to an image tube positioned above the patient's back. Since the lumbar spine may now be operated upon in the kneeling position, yet under full biplane x-ray visualization, guided surgical procedures on the lumbar spine may be performed that have previously been impossible.

THE DRAWING

The invention will be more easily understood in reference to the drawing, all figures of which are schematic, wherein.

Figure 1:
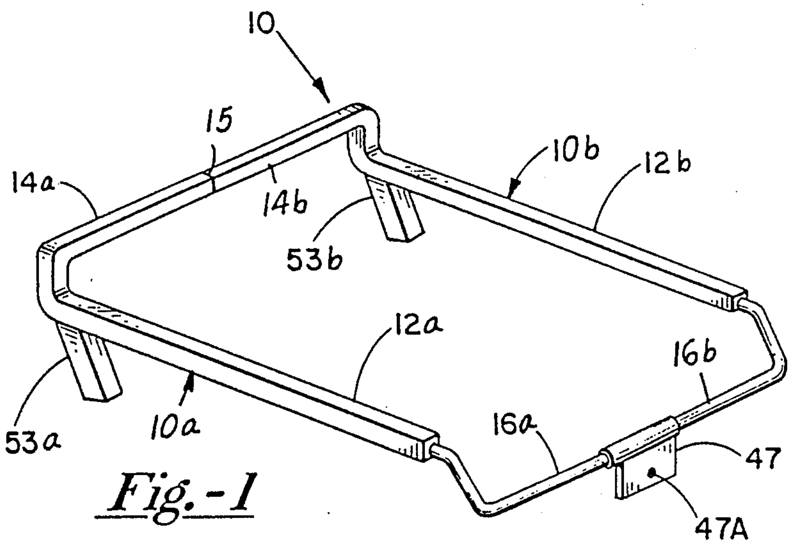
FIG. 1 is a perspective view of a pair of interconnected rigid frames that can be used in framework of the invention.

FIG. 1 shows a rectangular retractor ring 10 formed by interconnecting a pair of rigid metal frames 10a and 10b, each having a long straight leg 12a and 12b. Extending substantially orthogonally from one end of each leg is a crossarm 14a and 14b, the ends of which interconnect telescopically at 15 to form an arch. Projecting substantially orthogonally from the other end of each leg is a crossarm 16a and 16b, the projecting ends of which are rotatably retained by a hinge 47. The frames 10a and 10b can be disconnected to permit them to fit within a conventional autoclave.

Figure 2:
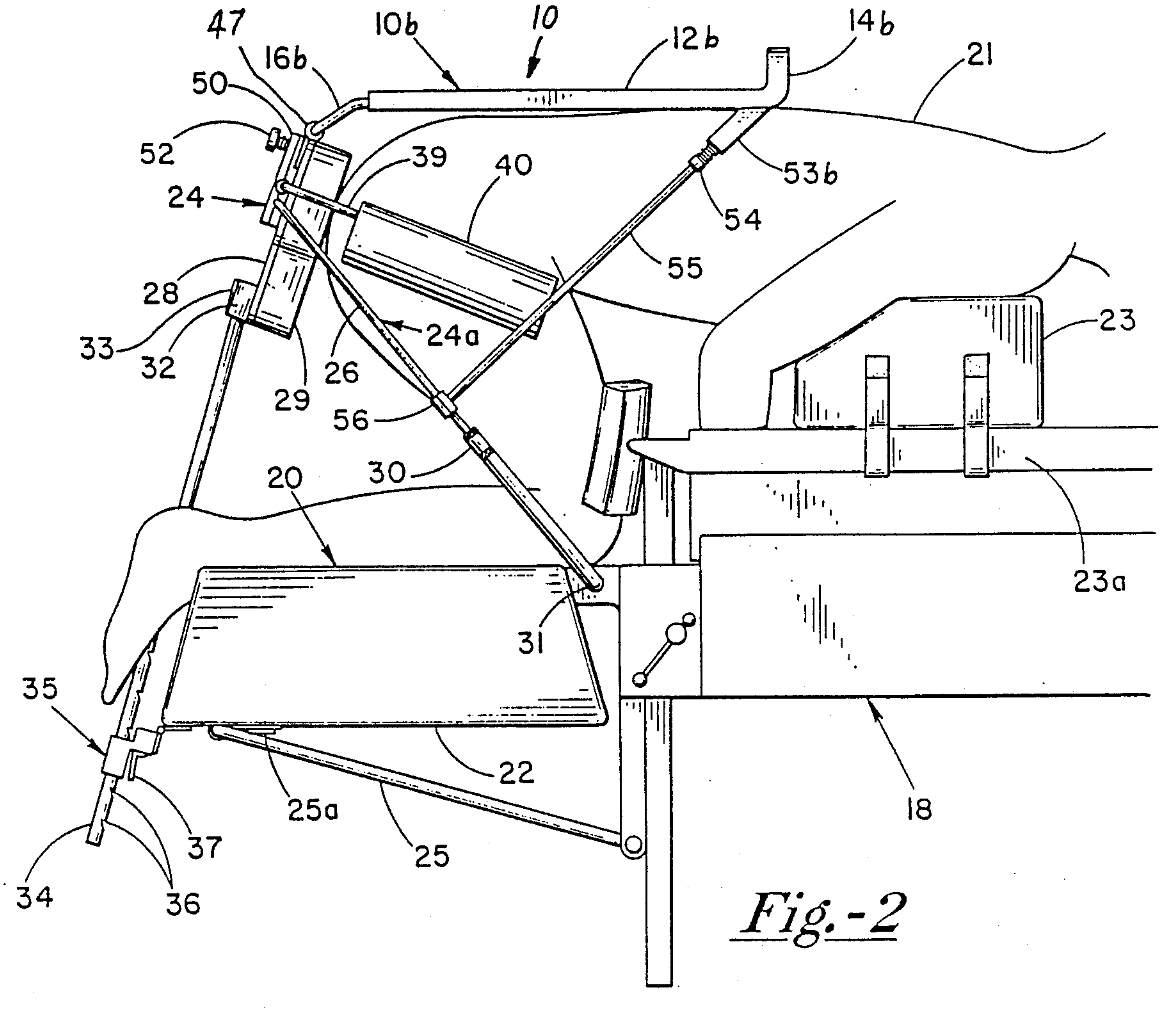
FIG. 2 is a plan view of a first framework of the invention including the rigid frames of FIG. 1 mounted on a buttocks support of a kneeling attachment to an operating table.

In FIG. 2, the retractor ring 10 is shown attached to an operating table 18 having a kneeling attachment 20 permitting a patient 21 to kneel on a platform 22 with the torso positioned over one end of the operating table and resting on a torso cushion 23 which is strapped to the siderails 23a of the operating table 18. The patient's buttocks rest against a buttocks support 24. As taught in the Ray et al. patent 4,662,619, the platform can either be supported from the floor by a post 25 or can be locked to move up and down with the operating table while the post 25 is retracted and held by a Velcro strap or spring clip 25a as in FIG. 2.

Figure 3:
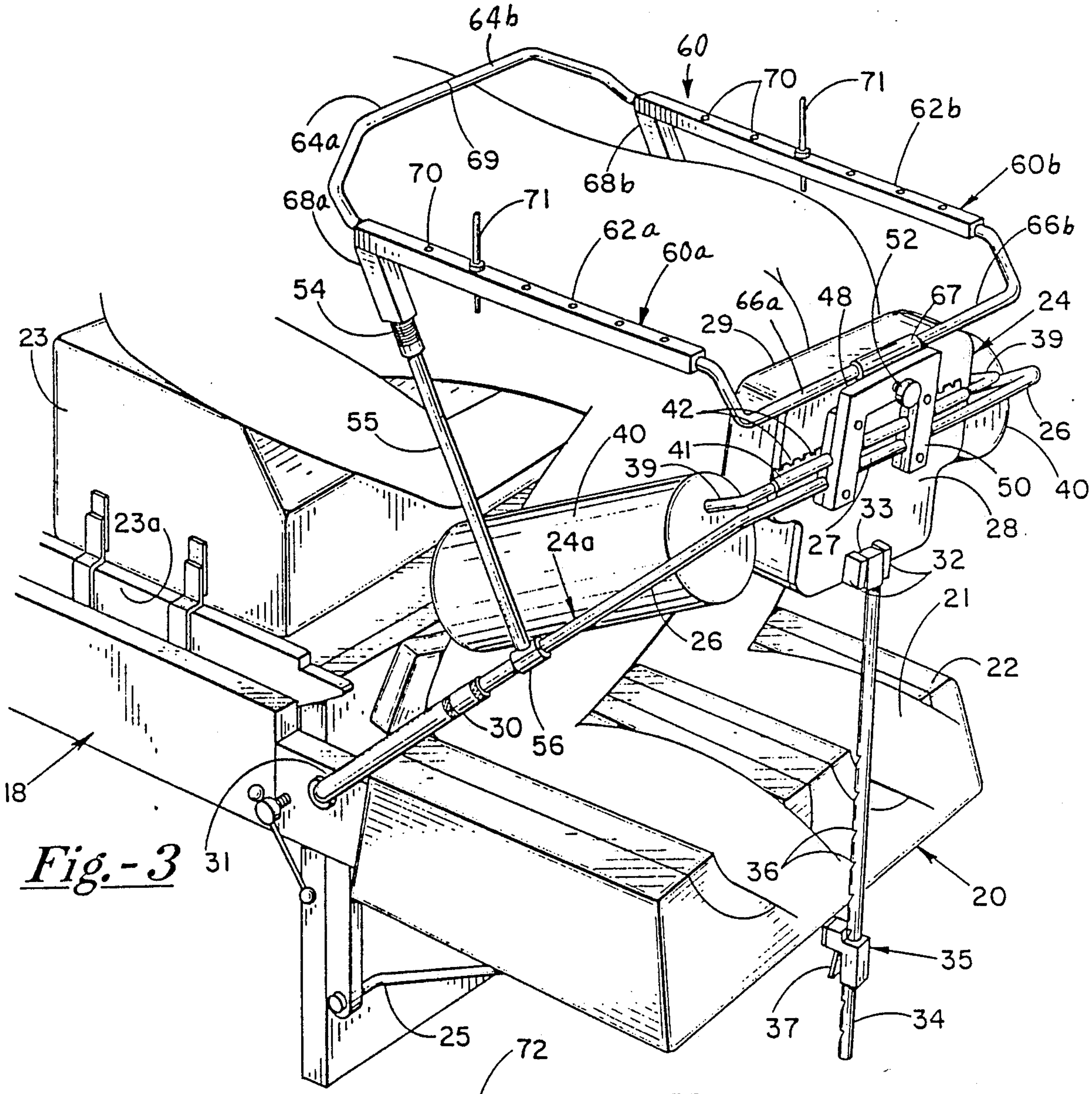
FIG. 3 is a perspective view of a second framework of the invention mounted on a buttocks support of a kneeling attachment to an operating table.

The buttocks support 24 includes a metal U-shaped yoke 24a having two arms 26 and a crosspiece 27 (see FIG. 3). Pivotably mounted on the crosspiece is a rigid seatplate 28, on the face of which is a buttocks cushion 29. The arms 26 of the yoke telescope at a friction lock 30 and are pivotably attached at 31 to the inboard end of the platform 22.

Pivotably mounted between two plates 32 bolted to the back of the seatplate 28 is a block 33 that is fixed to the upper end of a metal mast 34, the lower end of which is telescopically connected to the outboard end of the platform 22 by a ratchet assembly 35. Formed in the inner facing surface of the mast 34 are notches 36 into which fit a spring-loaded lever 37 (spring not shown) that can be manually retracted to lower the mast.

Pivotably and slidably positionable at the back of the seatplate 28 is each of a pair of metal L-shaped rods 39. A first arm of each of the rods fits snugly into an off-center bore of a cylindrical thigh-supporting cushion 40. Welded to the second arm of each of the rods is a bracket 41 (FIG. 3) that is formed with notches 42 into which fits a pin (not shown) protruding from the back of the seatplate 28. When an attendant lifts a thigh-supporting cushion 40, the bracket 41 is moved away from the pin, thus permitting the attendant to slide the second arm of the L-shaped rod 39 in the direction of the crosspiece 27 until its thigh-supporting cushion fits snugly against a patient's thigh, and then to push the cushion downwardly until the pin fits into another notch 42.

The hinge 47 between the rigid frames 10a and 10b has a tang that fits into a slot 48 between the back of the seatplate 28 and a split bracket 50 that is bolted to the seatplate. When the tang of the hinge 47 is inserted into the slot as shown in FIG. 2, a knob 52 that is threaded into the under half of the split bracket 50 is tightened into a seat 47A (FIG. 1) in the tang of the hinge to lock rotatably the crossarms 16a and 16b to the buttocks support 24. In this way each of the crossarms 16a and 16b (sometimes called the "first crossarms") are releasably and rotatably attached to the crosspiece 27 that is supported from the operating table 18 to extend above and across the patient 21.

Welded to the legs 12a and 12b are stubs 53a and 53b, into each of which is threaded a collar 54 at the end of a shaft 55. The other end of the shaft is attached by a split clamp 56 to one of the arms 26 of the U-shaped yoke 24a. The threaded collars permit the frames 10a and 10b to be raised or lowered, but never to the extent that there is any danger of the second crossarms 14a and 14b coming into contact with the back of the patient's chest.

The rectangular retractor ring 10 should be mounted on the buttocks support 24 after the patient has been covered by surgical drapery. This enables the retractor ring to be removed more quickly should there be an emergency requiring that the patient be turned face-up. It also permits one or both of the rigid frames 10a and 10b to be removed and reattached without disturbing the drapery. After the drapery has been pushed into the slot 48 by the tang of the hinge 47, it would be awkward to tighten the knob 52 by twisting it through the drapery. Hence, it would be preferred to employ some other means for clamping the tang of the hinge into the slot 48. For example, the tang can be clamped by a toggle actuated by moving a lever that is inside the drapery but can be pushed from the outside of the drapery. Another means employs a hinge having a split tang which expands in the slot 48 by turning a screw that is outside of the drapery.

The framework shown in FIG. 3 is used with the same operating table 18, kneeling attachment 20, and buttocks support 24 as are shown in FIGS. 1 and 2. The framework of FIG. 3 includes a rectangular retractor ring 60 formed by a pair of rigid metal frames 60a and 60b having long straight legs 62a and 62b, respectively, that extend parallel to each other. Projecting substantially orthogonally from one end of each of the legs is a crossarm 64a and 64b (sometimes called a "second crossarm") which when telescopically interconnected at 69 form an arch extending away from the patient's back. Projecting substantially orthogonally from the other end of each of the legs is a first crossarm 66a and 66b, the projecting end of which is rotatably retained by a hinge 67 having a tang that is locked to the buttocks support 24 in the same manner as is the hinge 47 of the retractor ring 10 of FIGS. 1 and 2. Extending downwardly, from the legs 62a and 62b near the ends of the arch-forming second crossarms 64a and 64b are internally threaded stubs 68a and 68b which permit the retractor ring 60 to be mounted on the buttocks support 24 in the same manner as is the retractor ring 10 of FIGS. 1 and 2.

Each of the rigid frames 60a and 60b is unitary, both for strength and for ease of being kept clean, and is sufficiently small to fit into a conventional autoclave for sterilization.

Formed in each of the legs 62a and 62b is a series of cylindrical openings 70 for receiving posts 71 to which surgical retractors or other instruments can be releasably attached.

Figure 4:
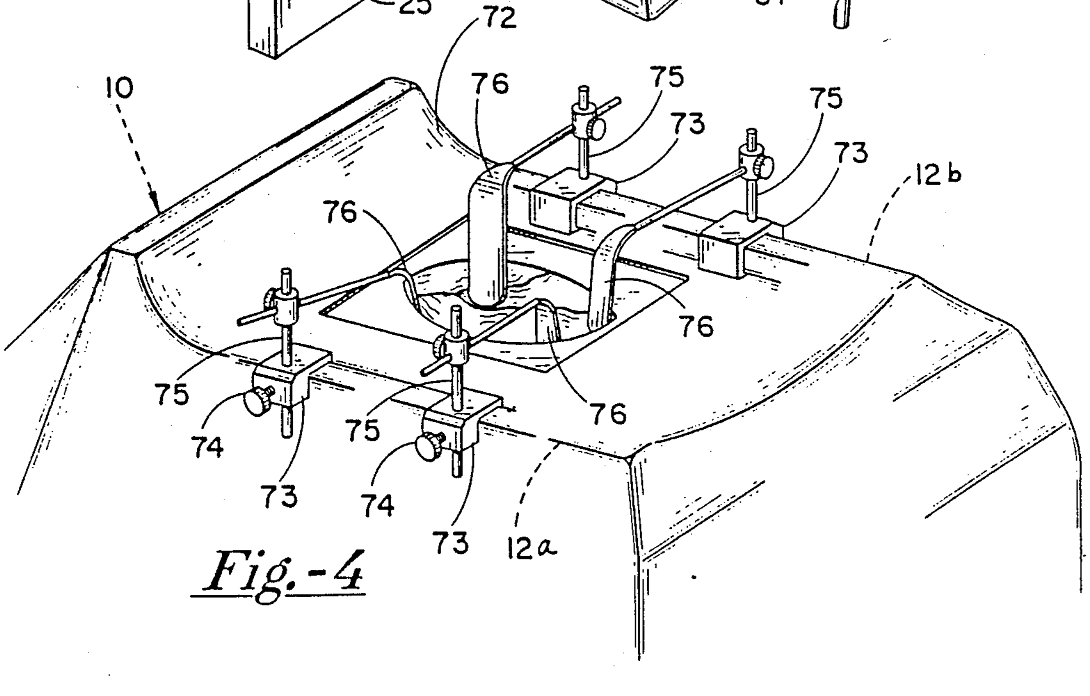
FIG. 4 is a perspective view showing the use of the framework of FIG. 3 by which a number of retractors are positioned in a surgical wound.

In FIG. 4, the rectangular retractor ring 10, while supported as shown in FIG. 2, has been covered by a surgical drape 72 over a kneeling patient. Fitting onto the legs 12a and 12b over the drape are four slides 73, each locked in place by a setscrew 74. Each slide carries an upstanding post 75 to which is clamped a surgical retractor 76. Any force applied laterally to one of the retractors 76 is counterbalanced by the thigh-supporting cushion 40 at the opposite side of the buttocks support 24, so that the patient is not moved out of position by the applied force.

Figure 5:
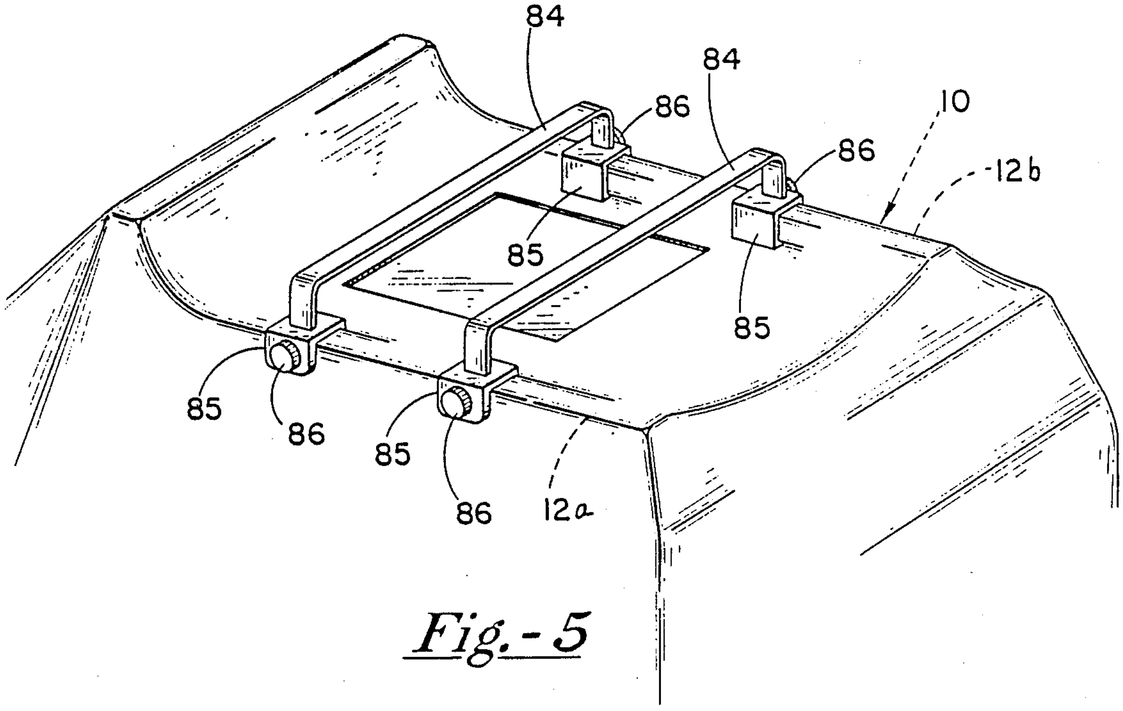
FIG. 5 is a perspective view showing the use of the framework of FIG. 3 to support a pair of rigid crossbars.

In FIG. 5 with the rectangular retractor ring 10 covered by a surgical drape, each of a pair of rigid crossbars 84 is secured by a pair of slides 85 across the legs 12a and 12b of the frame, and each slide is locked in place by a setscrew 86.

Figure 6:
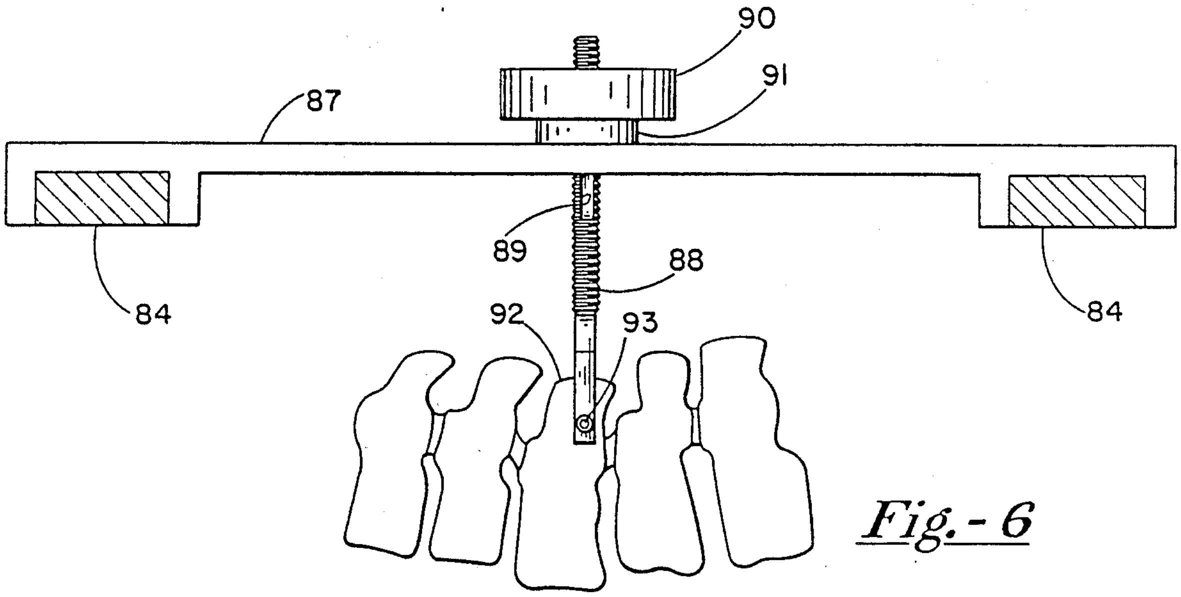
FIG. 6 is a plan view showing the use of the rigid crossbars of FIG. 5 in a surgical procedure by which a dislocated vertebra can be moved into position.

In FIG. 6, a rigid bar 87 rests across the pair of crossbars 84 of FIG. 6 that are attached to the legs of the retractor ring 10. Slidably received in a cylindrical opening through in the center of the bar 87 is a screw 88 which is formed with a slot 89 that fits into a key (not shown) in the cylindrical opening to prevent the screw from rotating. The screw 88 mates with a knurled nut 90 that is spaced from the bar by a washer 91. A dislocated vertebra 92 has been drilled to receive a pin 93 by which the vertebra is releasably fastened to the bifurcated end of the screw 88. Rotation of the nut 90 will lift the dislocated vertebra into alignment. During this procedure, it may be desirable to suspend other clamps (not shown) from one or more of the crossbars 84, bar 87, legs 12a and 12b, and crossarms 14,16 in order to hold the other parts of the spine in alignment.

Figure 7:
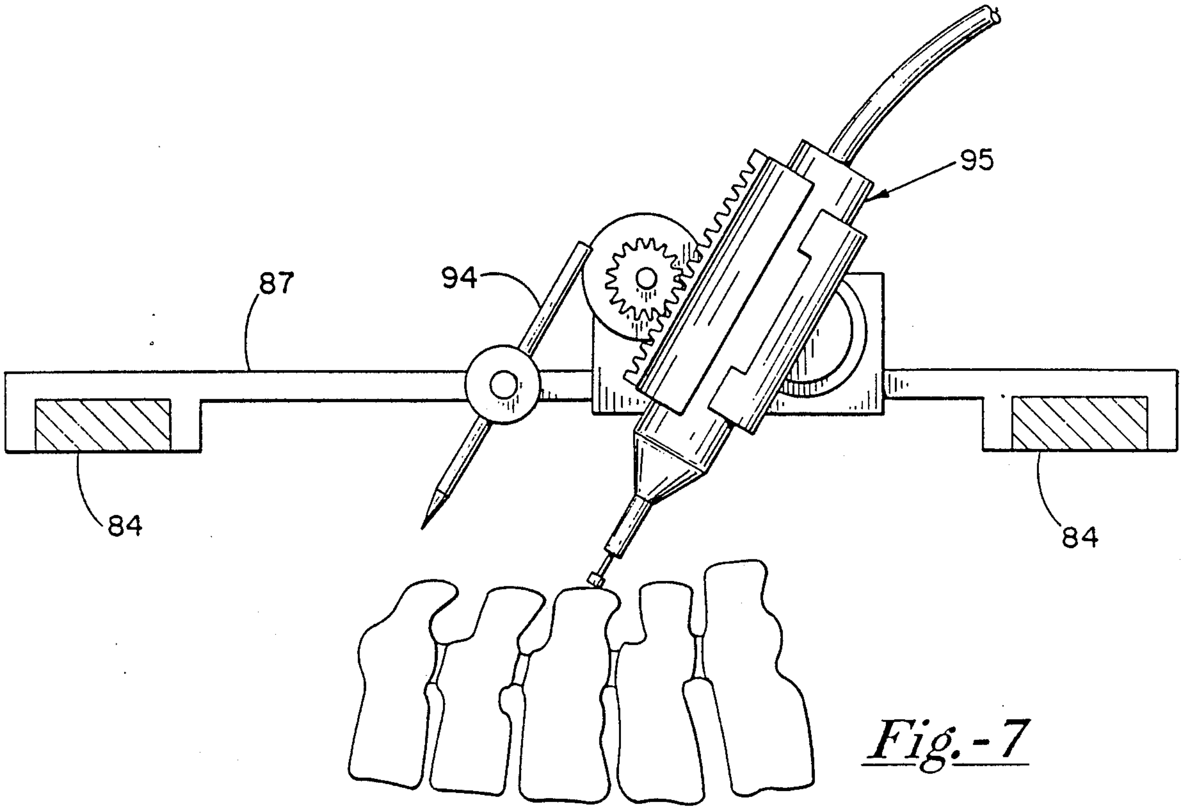
FIG. 7 is a plan view showing two surgical instruments suspended above a surgical wound using the rigid crossbars of FIG. 5.

In FIG. 7, the rigid bar 87 of FIG. 6 is used to position a pointer 94 and a drill 95 above a patient's backbone. After using the pointer to determine the exact location and angle at which a hole is to be drilled in a vertebra, the drill is moved along the bar 87 to the identical position and angle and held securely while the hole is drilled.

For use in FIG. 7, both the rigid bar 87 and the pointer 94 preferably are radiolucent except that they may include uniformly spaced radiopaque markers. The pointer 94 preferably includes a radiopaque wire extending the length of the pointer along its axis. After X-rays have shown that one or more of such pointers have been correctly positioned, they can be replaced one at a time by the drill 95. Both the pointers and the drill can be attached to the bar 87 by universal pivots.

Figure 8:
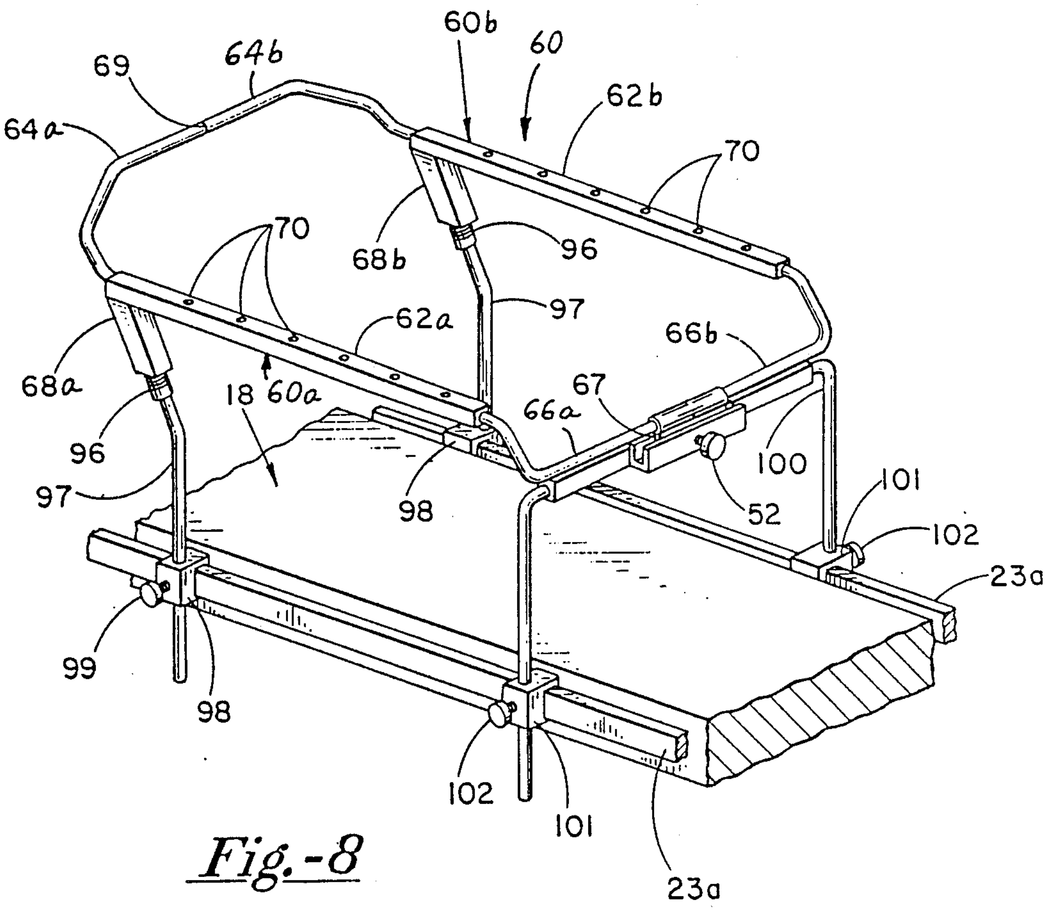
FIG. 8 is a perspective view of a third framework of the invention wherein the interconnected frames of FIG. 3 are attached to the siderails of an operating table.

FIG. 8 shows how the retractor ring 60 of FIG. 3 can be fitted to be fastened to the operating table 18 for use at a surgical wound in the abdomen or chest of a supine patient or in the back of a prone patient. Screwed onto each of the stubs 68a and 68b is a threaded collar 96 at one end of a support 97, the other end of which is secured to a slide 98 that can be locked with a knob 99 to a siderail 23a of the operating table 18. The tang of the hinge 67 is clamped onto the crosspiece of a yoke 100, each end of which is secured to a slide 101 having a knob 102 by which it can be locked to one of the siderails. In this way, the projecting ends of the so-called first crossarms 66a and 66b are releasably and rotatably attached to the crosspiece of the yoke 100, which crosspiece extends above and across a prone or supine patient.

Figure 9:
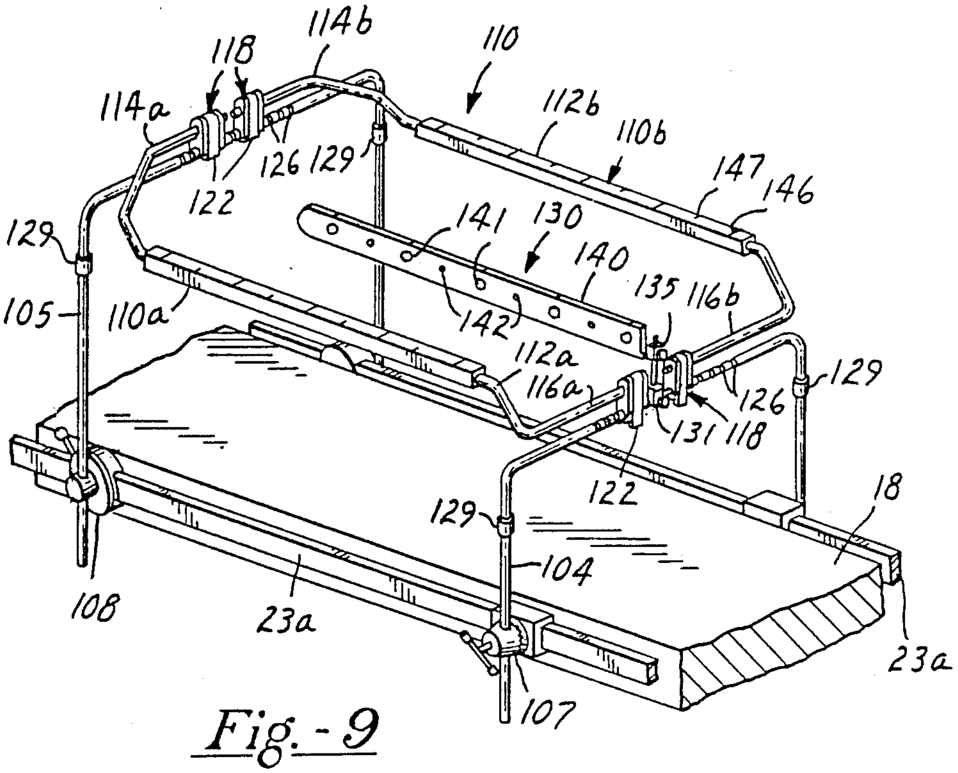
FIG. 9 is a perspective view of a fourth framework of the invention plus a measuring device.

The framework of FIG. 9 includes first and second yokes 104 and 105, respectively. The first yoke 104 is fastened to the side rails 23a of the operating table 18 by a pair of Clark sockets 107, e.g., Clark socket No. 5393 of Orthopedic Systems, Inc., Hayward, Calif. The second yoke 105 is fastened to the side rails by a pair of sockets 108 that permit the yoke to be rotated without releasing the yoke. The rotatable sockets 108 are disclosed in U.S. Pat. application S.N. 182,402, filed Apr. 18, 1988, which disclosure is incorporated herein by reference.

The yokes 104 and 105 serve to support a rectangular retractor ring 110 slightly above a patient (not shown) who is lying on the operating table 18. The retractor ring is formed by a pair of rigid metal frames 110a, and 110b, each having a long straight leg 112a and 112b. Projecting substantially orthogonally from one end of each leg is a crossarm 114a and 114b (sometimes called a "second crossarm") which together form an arch, and extending substantially orthogonally from the other end of each leg is a first crossarm 116a and 116b. Fixed to the projecting end of each crossarm is a bracket 118 which has a split saddle 120 (FIG. 11) that is rotatably attached to the crosspiece of one of the yokes 104 and 105.

Figure 11:
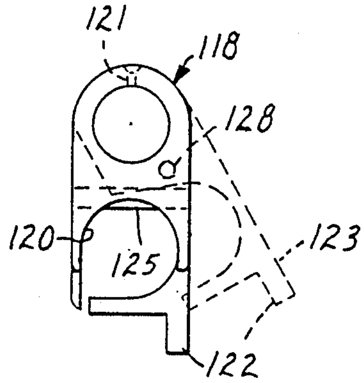
FIG. 11 is an enlarged plan view of one of the split saddles of FIG. 10.

As shown in FIG. 11, each bracket 118 has a bore 121 for receiving a setscrew (not shown) by which the bracket is fixed to a crossarm of one of the rigid frames 110a and 110b. At the center of the bracket is a latch 122 which pivots to the phantom position 123 to permit the bracket to be fitted to first and second crosspieces of first and second yokes 104 and 105, respectively. A pin 125 that has been press-fit into a bore through the bracket 118 drops into one of a series of annular grooves 126 in the crosspieces of the yokes. The latch 122 then is held is the closed position by a spring-loaded detent 128.

The yokes 104 and 105 can be disconnected at 129 to permit them to fit into a conventional autoclave.

In the course of a surgical operation, the retractor ring 110 or only one of its rigid frames 110a and 110b can be moved out of the way from time to time. This is easily accomplished by disconnecting one or both of the frames 110a and 110b from the second yoke 105 and pivoting it out of the surgeon's way without touching any of the sockets. When both of the frames are disconnected, the second yoke can also be pivoted away on the rotatable sockets 108.

Figure 12:
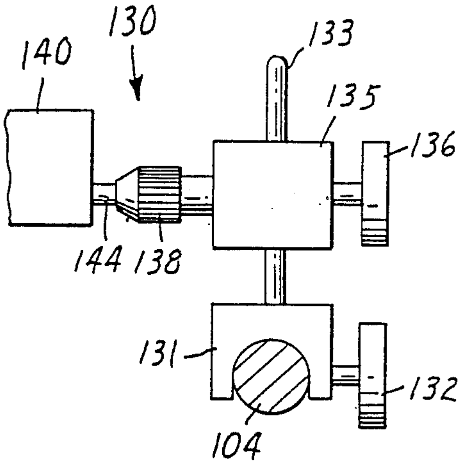
FIG. 12 is an enlarged plan view of a portion of the measuring device shown in FIG. 10.

FIG. 9 also shows a demountable measuring device 130 that is also shown in FIG. 12. The measuring device consists of

- a saddle 131 that rests on the crosspiece of the first yoke 104,
- a first setscrew 132 to lock the rotatably mounted saddle 131 to the crosspiece,
- an upstanding post 133 projecting from the saddle 131,
- a slide 135 mounted on the post 133,
- a second setscrew 136 to lock the slide 135 to the post at a desired height,
- a collet 138 projecting from the slide,
- a radiolucent scale 140 in which radiopaque shot is embedded, there being a large size shot 141 at 10-cm intervals and a smaller shot 142 at midpoints between the large shot.

The free end of the scale 110 may be rested against the patient's body or held in a position above the body by the setscrew 132. In order to reduce distortion of measurements relating the scale 140 to the patient's anatomy, the scale should remain in close proximity to the body while the x-ray exposures are made.

A cylindrical dowel 144 projecting from the scale 140 is received by the collet 138 to permit the scale to be rotated to the desired attitude and then locked. When the bed of the operating table is radiolucent, x-rays can be taken vertically. Because the retractor ring 110 usually is positioned at the level of the top of the patient's body, x-rays can also be taken horizontally. In either event, the scale can be rotated so that its flat face is perpendicular to the direction of the x-rays. By being cylindrical, the scale would not need to be mounted rotatably.

The upper surfaces of the legs 112*a* and 112*b* of the retractor ring 110 have major index marks 146 every 10 cm and minor index marks 147 midway between the major index marks. The shot 141 and 142 in the scale 140 are aligned with the index marks, and that alignment can be checked by laying a straight edge across the legs 112*a* and 112*b*. Hence, an x-ray showing the scale 140 can be used in combination with the index marks 146 and 147 to position with precision instruments such as the drill 95 of FIG. 7.

Figure 10:
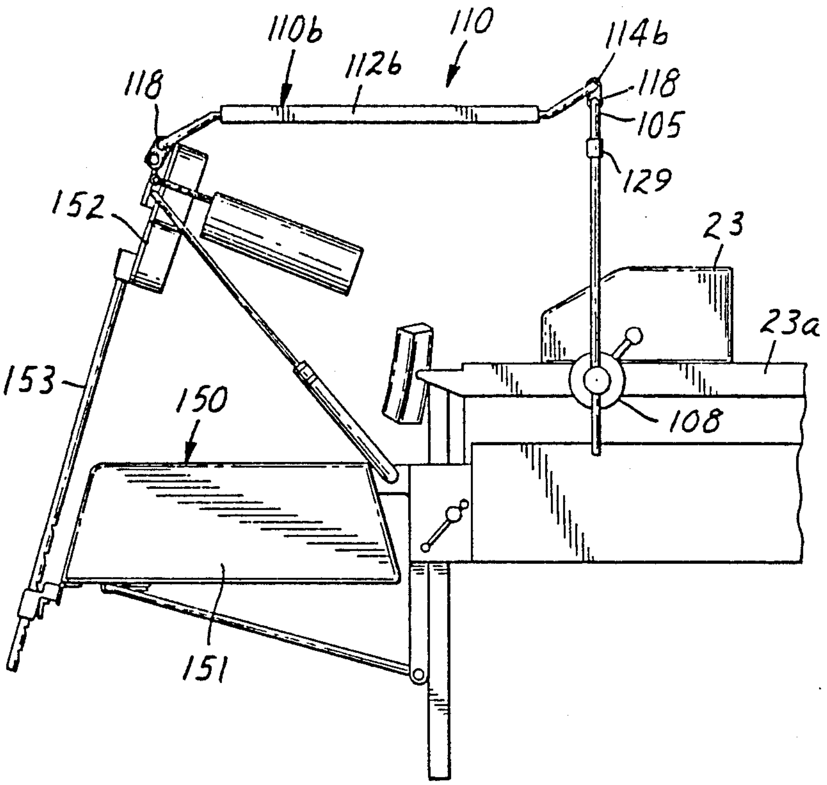
FIG. 10 is a plan view of a fifth framework of the invention that includes the same rectangular retractor ring as does the framework of FIG. 9.

As shown in FIG. 10, the retractor ring 110 of FIG. 9 can be be used with a patient in the kneeling position. The split saddles 120 at the arched end of the retractor ring are attached to the crosspiece of the second yoke 105, and the other end of the retractor ring is supported by a kneeling attachment 150 that includes a kneeling platform 151, a buttocks support 152, and a mast 153 telescopically connecting the buttocks support to the platform. Extending across the top of the buttocks support is a rigid crosspiece to which the split saddles 120 at said other end of the retractor ring are rotatably attached.

EXAMPLE

A prototype of the frame 60 of FIG. 3 has been made from stainless steel to the following dimensions:

| | |
|---|---|
| Thickness of legs 62 | 1.6 cm square |
| Overall length | 60 cm |
| Overall width | 40 cm |
| Diameter of openings 54 | 0.64 cm |
| Rise of arc of inboard crossarm 44 | 7.8 cm |

We claim:

1. Framework for supporting surgical instruments at a surgical wound, said framework comprising:
   - a rigid frame comprising a long leg and first and second relatively short, parallel crossarms projecting substantially orthogonally from ends of the leg, each of said crossarms defining a projecting end located distally from said leg,
   - first and second rigid crosspieces,
   - means adapted for supporting the first and second crosspieces from an operating table in order for the first and second crosspieces to extend above and across a patient who is lying on the operating table,
   - means for releasably and rotatably attaching the projecting ends of said first and second crossarms to the first and second crosspieces, respectively in order to support the rigid frame above and across a patient who is lying on the operating table and to allow the rigid frame to be rotatably moveable with respect to the table.

2. Framework for supporting surgical instruments at a surgical wound, said framework comprising:
   - a rigid frame comprising a long leg and first and second relatively short, parallel crossarms projecting substantially orthogonally from ends of the leg, each of said crossarms defining a projecting end located distally from said leg,
   - a rigid crosspiece,
   - means adapted for supporting the crosspiece from an operating table in order for the rigid crosspiece to extend above and across a patient who is lying on the operating table,
   - means for releasably and rotatably attaching the projecting end of said first crossarm to the crosspiece in order to support the rigid frame above and across a patient who is lying on the operating table and to allow the rigid frame to be rotatably moveable with respect to the table,
   - means adapted for supporting the projecting end of said second crossarm above and from the operating table in order to further support the rigid frame above and across a patient who is lying on the operating table, said second crossarm being arched to follow the contour of the patient's body.

3. Framework for supporting surgical instruments at a surgical wound, said framework comprising:
   - a rigid crosspiece,
   - means adapted for supporting the crosspiece from an operating table in order for the rigid crosspiece to extend above and across a patient who is lying on the operating table,
   - a first rigid frame comprising a first long leg and first and second relatively short, parallel crossarms projecting substantially orthogonally from ends of the first leg, each of said crossarms defining a projecting end located distally from said first leg,
   - means for releasably and rotatably attaching the projecting end of said first crossarm of said first leg to the crosspiece in order to support the first rigid frame above and across a patient who is lying on the operating table and to allow the first rigid frame to be rotatably moveable with respect to the table,
   - a second rigid frame that is a mirror image of the first rigid frame including a second long leg and first and second relatively short, parallel crossarms projecting substantially orthogonally from ends of the second leg, each of said first and second crossarms of said second leg defining a projecting end located distally from said second leg, and, the second rigid frame with the first rigid frame forming a rectangular retractor ring with the projecting end of said first crossarm of the second rigid frame rotatably attached to said crosspiece in order to support the second rigid frame above and across a patient who is lying on the operating table and to allow the second rigid frame to be rotatably moveable with respect to the table, and
   - means for supporting the projecting end of said second crossarm of the first rigid frame and the second crossarm of the second rigid frame above and from the operating table in order to further support the first and second rigid frames above and across a patient who is lying on the operating table.

4. Framework as defined in claim 3 wherein one crossarm of each of the first rigid frame and the second rigid frame is arched to follow the contour of the patient's body and the two arched crossarms together form an arch with the first and second rigid frames forming a rectangular retractor ring.

5. Framework for supporting surgical instruments at a surgical wound, said framework comprising:
   - a rigid frame comprising a long leg and first and second relatively short, parallel crossarms projecting substantially orthogonally from ends of the leg, each of said crossarms defining a projecting end located distally from said leg,
   - said leg bearing uniformly spaced index marks, a demountable measuring device comprising a radiolucent scale containing radiopaque markers at the same spacing as that of said index marks, a rigid crosspiece, means adapted for supporting the crosspiece from an operating table to extend above and across a patient who is lying on the operating table, means for releasably and rotatably attaching the projecting end of said first crossarm to the crosspiece, in order to support the rigid frame above and across a patient who is lying on the operating table and to allow the rigid frame to be rotatably moveable with respect to the table, means for supporting the projecting end of said second crossarm above and from the operating table in order to further support the rigid frame above and across a patient who is lying on an operating table.

6. Framework as defined in claim 5 wherein said scale has a flat face and is rotatably mounted.

* * * * *